July 20, 1926.

A. H. HAWORTH 1,593,258

TRACTOR ORCHARD CULTIVATOR

Filed May 21, 1924

2 Sheets-Sheet 1

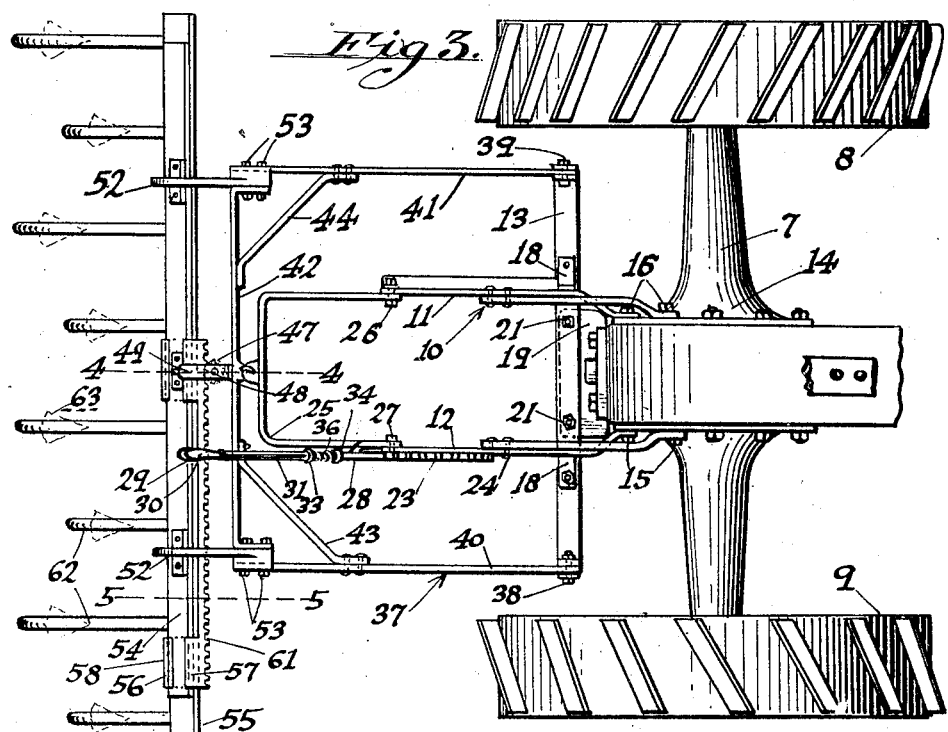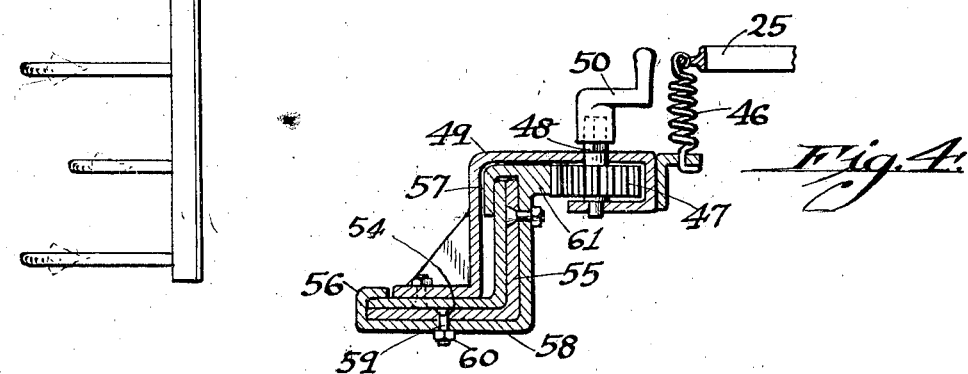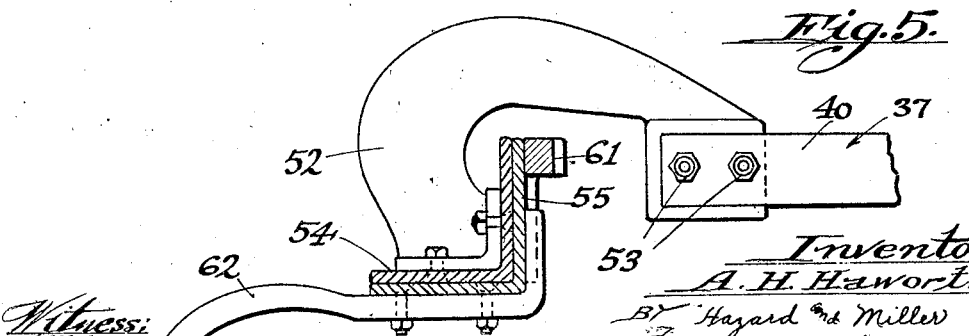

Patented July 20, 1926.

1,593,258

UNITED STATES PATENT OFFICE.

ALMON H. HAWORTH, OF CHATSWORTH, CALIFORNIA.

TRACTOR ORCHARD CULTIVATOR.

Application filed May 21, 1924. Serial No. 714,835.

This invention relates to cultivators, and more particularly it relates to cultivators particularly adapted for the cultivation of orchards.

An object of this invention is the provision of a cultivator rigidly secured to a tractor whereby the necessity of having a cultivator mounted on wheels is obviated.

Another object of this invention is the provision of a cultivator which is in combination with a tractor, said cultivator being provided with laterally slidable cultivating members, the slidable feature being valuable for cultivating the ground adjacent trees in an orchard.

Another object of my invention is to employ a construction for attaching the cultivators to a frame extending rearwardly from the tractor so that the cultivators may be quickly changed in order to substitute different types of implements.

With the foregoing objects in view, together with such other objects and advantages as may subsequently appear, this invention consists in the construction and arrangement of parts hereinafter described and claimed and illustrated in the accompanying drawings, in which:—

Figure 1:
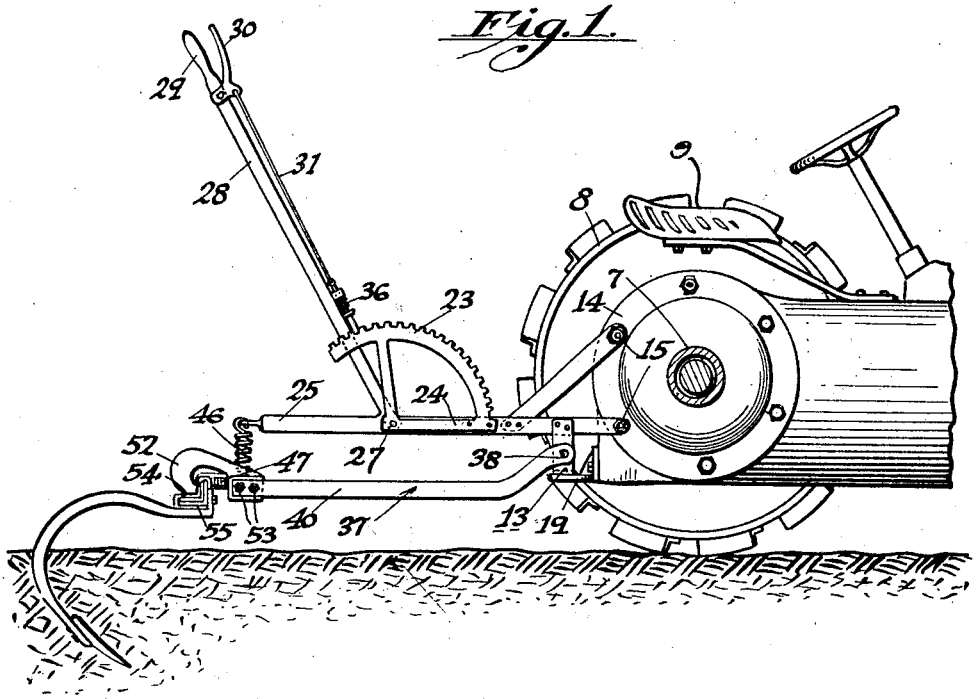
Figure 2:
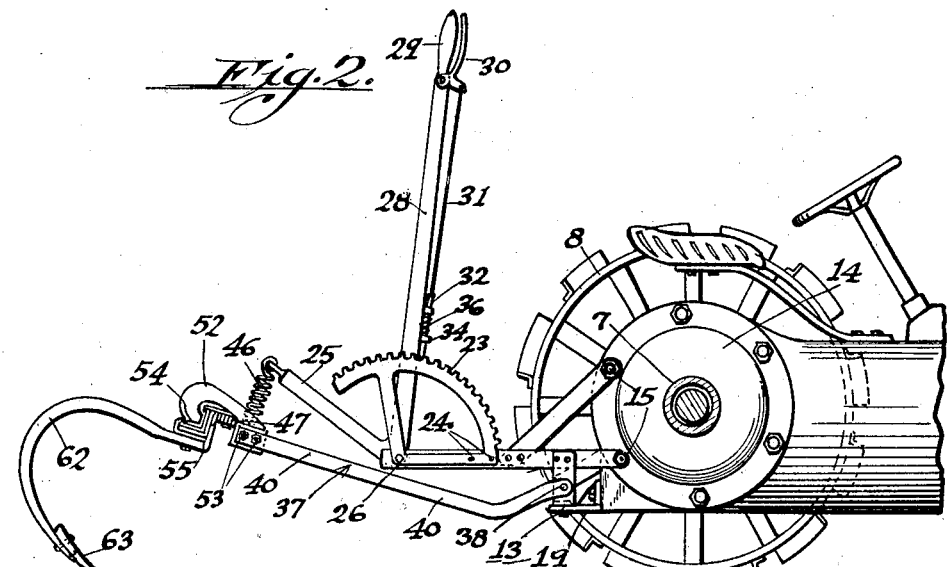

Figure 1 is a side elevation of my improved cultivator, shown as rigidly secured to the casing of a rear axle of a tractor, the cultivator being shown in active or cultivating position, Fig. 2 is a view similar to Fig. 1, but showing the cultivator in raised or inactive position, Fig. 3 is a plan view of my cultivator, showing it attached to a tractor, Fig. 4 is a section taken on the line 4—4 of Fig. 3, and Fig. 5 is a section taken on the line 5—5 of Fig. 3.

Referring to the drawings for a more detailed description thereof, the numeral 7 indicates a casing of the rear axle of a tractor having rear wheels 8 and a seat 9. A frame 10 comprising rearwardly extending side members 11 and 12 and a transverse member 13 secured to, and extending beyond, the members 11 and 12, is rigidly secured to a differential casing 14 by bolts 15 and 16 which pass respectively through the members 11 and 12. The transverse member 13 is secured to the side members 11 and 12 by angle irons 18 bolted to said sides and to said transverse member, the transverse member 13 lying below the side members 11 and 12.

A member 19 is secured to, or made integral with, the differential casing 14, and is also secured to the transverse member 13 by bolts 21. The member 19 gives additional rigidity to the connection of the frame comprising the elements 11, 12 and 13 to the tractor. An arcuate notched member 23 is secured by means of bolts 24 to the side member 12.

A second frame 25 is pivotally mounted at 26 and 27 on the side members 11 and 12. A lever 28 having a handle 29 is secured to the frame 25. A lever 30 is pivotally mounted on the lever 28 and is connected to a member 31, which in turn is connected to a pin 32, passing through projections 33 and 34 which are formed on the lever 28. The pin 32 is adapted to engage any desired notch in the arcuate member 23. A coiled compression spring 36 is associated with the pin 32 to keep the latter engaged between any two teeth of the member 23.

A third frame 37 is pivotally connected at 38 and 39 to the transverse member 13 and comprises side members 40 and 41 respectively which are connected together at their rear ends by a transverse member 42. A brace 43 connects the side 40 to the transverse member 42 and a brace 44 connects the side member 41 to the transverse member 42. The frame 25 is resiliently connected to the frame 37 by means of a coiled spring 46, the latter being secured at its top to the transverse member of the frame 25 and at its bottom to the transverse member 42 of the frame 37. A pinion 47 is mounted on a vertical pin 48 which is carried in a member 49 secured to the transverse member 42 of the frame 37. The pin 48 extends above the upper surface of the member 49 and is provided at its upper end with a crank 50 by which the pinion 47 may be rotated.

At the rear of the side members 40 and 41, arcuate members 52 are secured by means of bolts 53 to the side members 40 and 41 respectively. The arcuate members 52 and also the member 49 are secured to a transverse angle iron 54 to which is slidably fitted an angle iron 55, the angle iron 54 being retained in the angle iron 55 by lugs 56 and 57 which form a part of a plate 58 secured by bolts 59 and nuts 60 to the angle iron 55. A rack 61 is secured to the vertical portion of the plate 58 on the inner side thereof, and is adapted to be engaged by the pinion 47. The angle iron 55 is provided with arcuate members 62, the alternate ones of which are shorter than the other members 62. Harrowing elements 63 are detachably affixed to the lower ends of the members 62.

In the operation of the cultivator, the driver may raise and lower the members 62 and 63 by manipulating the lever 28, as will be readily understood, the raised position being illustrated in Fig. 2 and the lowered position being shown in Fig. 1. By manipulation of the lever 28, the depth of the element 63 in the ground may also be regulated.

When it is desired to cultivate under a tree which is in the way of the tractor, the angle iron 55 may be shifted laterally either to the right or left by raising the cultivating members and turning the crank 50 through which the rack and pinion are operated. The lateral movement of the cultivating elements is illustrated in Fig. 3.

Thus it will be seen that I have produced a cultivatng device comprising a frame rigidly secured to a tractor, an arcuate notched member secured to said frame, a second frame pivoted to the first frame and extending rearwardly thereof, a lever adjacent the driver's seat of said tractor, said lever being secured to the second frame and adapted to raise and lower the second frame and to releasably engage said arcuate notched member, a third frame pivoted to the first frame and resiliently connected to the second frame, cultivating members slidably secured to said third frame, a rack secured to said cultivating members, a pinion mounted on said third frame and engaging said rack, and a handle adapted to turn said pinion to move said cultivating members.

During dry seasons or in arid regions, it is necessary to rely on irrigation, and in order to distribute water, small furrows or ditches must be dug, as is well understood.

With the ordinary cultivating implements, furrowing blades or shovels are substituted for the harrowing blades by first removing the harrowing blades (usually about eleven in number) from the cross bar, and then fastening three furrowing shovels on the same bar—usually consuming about two hours time. From the construction of my device, it will be seen that the angle iron or bar 55 carrying the harrowing blades 63 is removable from its supporting member. Therefore, when it is necessary to change from harrowing to furrowing, as mentioned above, the bar carrying the harrowing blades is removed and a similar bar carrying furrowing blades is inserted in place thereof, which only requires about two or three minutes, thus saving considerable time and labor.

From the above description it will be seen that the bar 54 is substantially permanently secured to the arcuate members 52 and that the angle iron 55 with the rack connected thereto may be slid longitudinally to one side or the other and completely removed from the bar 54. A similar bar 55 with a similar plate 58 with a rack secured thereto may then be inserted on the end of the bar 54, such bar 55 carrying a different type of cultivator members 62 and 63. As soon as the rack engages the pinion the pinion may be turned to draw the bar 55 into proper position. If desired the plate 58 having the rack thereon may be detached from one bar 55 having a certain type of cultivator teeth and attached to another bar having a different type of cultivator teeth. Thus I may readily replace one type of cultivator by substituting the whole bar 55 with a new rack or by changing the rack to another bar 55 having different cultivators.

This invention has been described but modifications thereof may be devised without departing from the spirit thereof, and it is to be understood that such modifications come within the scope of this invention.

What is claimed is:—

1. An orchard cultivator comprising in combination a tractor, a cultivator frame connected to the tractor and having a pair of supporting elements at its rear end, a readily removable cultivator comprising a transverse bar bolted to said supporting elements, a slidable bar mounted on the transverse bar to slide lengthwise thereon, a rack connected to said slidable bar, cultivator elements connected to the slidable bar, a pinion supported by the cultivator frame, meshing with the rack and manual means to operate the said pinion.

2. An orchard cultivator as claimed in claim 1, having in addition a member connected to the cultivator frame, bolted to the transverse bar, said member forming a mounting for the pinion.

3. A tractor orchard cultivator comprising in combination a tractor, a frame connected to the tractor, a pair of arcuate members connected to the frame, a transverse angle iron bolted to the arcuate members, a sliding angle iron mounted on the transverse angle iron, to slide lengthwise thereof, individual elements secured to the sliding angle iron, a rack rigidly connected to the sliding angle iron, a pinion supported in a stationary position in reference to the said frame, and manual means to operate said pinion.

4. A tractor orchard cultivator as claimed in claim 3, in which the means to support the pinion comprises a Z-shaped member attached to the frame and bolted to the transverse angle iron, the pinion being mounted on a vertical axis in the said member.

5. An orchard cultivator comprising in combination a tractor, a frame attached thereto and extending rearwardly, arms extending rearwardly from the frame, a transverse angle iron bolted to said arms, a slidable angle iron positioned on the transverse angle iron, with the angle portions fitting together, a plate secured to the slidable angle iron and having lugs engaging over the transverse angle iron, a rack formed on the said plate and a manually operated pinion supported in a stationary position in reference to the said frame, the pinion meshing with the rack.

6. An orchard cultivator comprising in combination arms operatively connected to a tractor and extending rearwardly therefrom, a transverse angle iron having its flanges detachably bolted to said arms, a sliding angle iron having its flanges engaging the flanges of the transverse angle iron, a plate in the form of an angle secured to the sliding angle iron, said plate having lugs extending over the flanges of the transverse and the slidable angle iron, a rack attached to the said plate, a pinion meshing with the rack, operatively supported in a fixed position from the tractor and manual means to operate said pinion.

7. An orchard cultivator as claimed in claim 6, in which the supporting means for the pinion comprises a Z-shaped member having a flange bolted to the transverse angle iron and having a return bend on its other flange forming a mounting for the pinion on a vertical axis the said Z-shaped member being operatively connected to the tractor.

8. An orchard cultivator comprising in combination a tractor, a first frame rigidly connected thereto, a second frame pivotally mounted on the the first frame, a lever connected to the second frame, an arcuate notched member on the first frame and means to operatively engage the hand lever to the arcuate member to adjust the second frame relative to the first frame, a third frame having side members and a transverse rear member, the side members being pivotally connected to the first frame and having a resilient connection to the second frame, arms connected to the third frame, a transverse angle iron bolted to said arms, a sliding angle iron mounted on the transverse angle iron to slide thereon, a rack connected to the sliding angle iron, a pinion supported in a stationary position from the third frame meshing with the rack and means to operate the said pinion.

In testimony whereof I have signed my name to this specification.

ALMON H. HAWORTH.